United States Patent Office 3,525,726
Patented Aug. 25, 1970

3,525,726
METHOD FOR ACCELERATING THE HARDENING OF ADHESIVES OR SEALING AGENTS WHICH HARDEN UNDER EXCLUSION OF OXYGEN
Joachim Galinke, Dusseldorf, and Bernd Wegemund, Hilden, Germany, assignors to Henkel & Cie G.m.b.H., Dusseldorf, Germany, a corporation of Germany
No Drawing. Filed Dec. 7, 1966, Ser. No. 599,727
Claims priority, application Germany, Apr. 15, 1966,
H 59,127
Int. Cl. C08f 3/64, 3/66
U.S. Cl. 260—89.5                              3 Claims

ABSTRACT OF THE DISCLOSURE

The present invention relates to a process for accelerating the hardening of adhesives or sealing agents which harden under exclusion of oxygen, said adhesive being based on mixtures of methacrylic acid esters or acrylic acid esters, organic peroxides and amines. The said accelerating is effected by organic isocyanates.

THE PRIOR ART

It is known that adhesive mixtures which harden under exclusion of oxygen and consist of methacrylic acid esters or of acrylic acid esters and organic peroxides which also may contain amines in small amounts, do not polymerize at all or only very slowly at room temperature on specific, so-called inactive metals, glass or plastics. To eliminate this disadvantage it is known to pre-treat the materials to be bonded with organic polyamines, if so desired with an addition of organic carboxylic acids. However, this mode of working does not render it possible to bond, for example, glass or plastics at below room temperature in a sufficiently short time for practical conditions.

OBJECTS OF THE INVENTION

The object of the invention is to present a method, by means of which disadvantages as described are avoided.

A further object of the present invention is the development of a process for the acceleration of the hardening of adhesive compositions which harden under the exclusion of oxygen which comprises the steps of interposing a layer of liquid esters of alcohols with acids selected from the group consisting of acrylic acid and methacrylic acid, said esters containing organic peroxides or hydroperoxides and an amine, between solid materials, and excluding oxygen from said layer in the presence of an accelerating amount of an organic isocyanate for a time sufficient to harden said adhesive composition.

These and other objects of the invention will become more apparent as the description thereof proceeds.

DESCRIPTION OF THE INVENTION

According to the invention this problem is solved in that the hardening process of the mixtures is accelerated by hardening in the presence of organic isocyanates. While these organic isocyanates can be admixed with the liquid adhesive compositions, it has been found most advantageous to pre-treat the materials to be bonded together with the organic isocyanates. By this pretreatment a deposit of the organic isocyanates is formed on the surface of the materials to be bonded.

The adhesive compositions to be activated are known in the art. They consist of liquid mixtures containing at least 20%, preferably 60% or more, of methacrylic acid esters or acrylic acid esters of the most varied polyhydric alcohols, as for example aliphatic polyhydric alcohols such as the following glycols: ethylene glycol, diethylene glycol, triethylene glycol, tetraethylene glycol, propylene glycol, butylene glycol, neopentyl glycol, and trimethylol propane. All of the hydroxyl groups of these polyhydric alcohols can be esterified with the acids mentioned. In addition, esters of the polyhydric alcohols containing free hydroxyl groups can be used. Furthermore methacrylic acid esters or acrylic acid esters of monohydric alcohols can be used, particularly cycloaliphatic monohydric alcohols, for example cyclohexanol, tetrahydrofurfuryl alcohol or 1,3-dioxa-2,2-dimethyl-4-methylol-cyclopentane, among others. Mixtures of the indicated esters of acrylic or methacrylic acid can also be used.

Preferred are those mixtures with a content of at least 20% of compounds of the general formula selected from the group consisting of

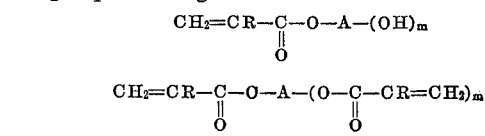

and

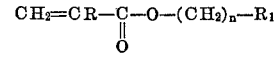

wherein R is a member selected from the group consisting of hydrogen and methyl, $m$ is an integer of 1, 2 and 3, $n$ is an integer selected from the group consisting of 0 and 1, A is a member selected from the group consisting of

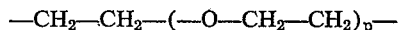

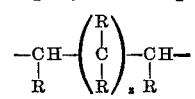

and

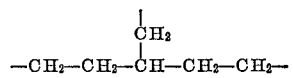

wherein R has the above assigned values, $p$ represents an integer of 1, 2, 3, 4 and 5 and $z$ represents an integer of 0, 1, 2, 3 and 4, and $R_1$ is a member selected from the group consisting of cyclopentanyl, cyclopentadienyl, cyclohexanyl, endomethylene cyclohexanyl, and their methyl substituted derivatives and their mono and dioxa derivatives.

The adhesive compositions polymerizing under exclusion of air contain in addition from about 0.1% to about 20% of organic peroxides or hydroperoxides. Preferable are organic percompounds selected from the group consisting of organic hydroperoxides derived from hydrocarbons which contain from about 3 to 18 carbon atoms, peroxide and diisopropylbenzene hydroperoxide; also tertiary butyl perbenzoate and 2,2-bis-(tert.-butylperoxy)-butane.

In addition to the substances previously mentioned, the adhesive mixtures should also contain amines, preferably aliphatic or aromatic tertiary amines, for example trialkylamines, such as triethylamine, tributylamine, N,N,N',N'-tetramethyl-1,4-butane diamine, N,N-diethylcyclohexylamine, dialkylarylamines, such as N,N-dimethylaniline, N,N-dimethyl-p-toluidine; tertiary heterocyclic amines, such as N-methylpiperidine, N-methylmorpholine, 1,4-diaza-bicyclo-(2,2,2)-octane, and others. These tertiary amines are utilized in amounts of from about 0.1% to 5% by weight.

The acceleration, as suggested by the invention, is effected with organic isocyanates containing one or more isocyanate groups and free of other groups which are reactive under the conditions of the reaction. The following organic mono or polyisocyanates can be utilized among others: phenylisocyanate, p-nitrophenyl isocyanate, hexamethylene diisocyanate, phenylene diisocyanate, toluylene diisocyanate, dimerized toluylene diisocyanate, diphenylmethane diisocyanate, naphthylene diisocyanate, triphenylmethane triisocyanate or the addition product of 3 mols of toluylene diisocyanate with one mol of trimethylolpropane. Furthermore, high-molecular weight isocyanates are suitable, as obtained, for example, from the aromatic uretdiones. Uretdiones are compounds formed by dimerization of polyisocyanates. Preferred are the polyvalent aromatic isocyanates. The acceleration of the hardening process is effected by the contacting of the organic isocyanate with the adhesive composition under exclusion of oxygen. The organic isocyanates are preferably applied to the materials to be bonded.

In the case where, according to the preferred version of the invention, the materials to be bonded together are pre-treated with the organic isocyanates, these are advantageously applied in the form of their solutions in inert organic solvents. Suitable solvents are those which dissolve or disperse the organic isocyanates and which evaporate at a rate sufficiently rapid to give a substantially solvent-free deposit of the organic isocyanates on the surface of the materials to be bonded. Preferred as solvents are: chlorinated hydrocarbons such as methylene chloride, ethylene trichloride, chloroform, carbon tetrachloride, or fluorohalogenated hydrocarbons and others. In some cases it is advisable to use mixtures of the previously mentioned solvents, possibly with the addition of low-boiling fluorochlorinated hydrocarbons.

The application of the solution to the surface of the materials to be bonded is effected by immersion, by application with a brush or by spraying, for example by spraying the solution with a spray gun or by spraying with an aerosol-type spray can. The volume of application shall be controlled to give a deposit of between about 0.1 to 10 gm. of organic isocyanate for each square meter of surface. Within this range, the amount of organic isocyanate depends on the characteristics of the adhesive mixture, of the isocyanates and on the rate of acceleration desired.

After the solvent has been evaporated, the adhesive compositions described in the preceding, which harden under exclusion of air, are applied onto the surfaces to be bonded together, and the work pieces are fixedly joined together or else subjected to a light pressure for a short time. In many cases a rigid bond is obtained after about 2 to 20 minutes, frequently after 5 to 10 minutes.

By means of the treatment with organic isocyanates even those metals or non-metals can be bonded, which, until now, were bonded only to a lesser degree with the previously described adhesive compositions hardening under exclusion of air. Thus, it is possible by the process of the invention to bond zinc, electrically-oxidized aluminum, highly-alloyed steels, cadmium, glass or plastics such as polymethmethacrylate and polyvinyl chloride.

The following examples are illustrative of the process of the invention. It is to be understood however that they are not to be deemed limitative in any manner.

The bonding processes as described in the following examples were effected on de-greased metal sheets measuring 20 x 100 mm., or on samples of glass as well as polymethylmethacrylate. The sheets were superimposed over a surface of 2 cm.$^2$ and held for bonding under a pressure of 0.05 kg./cm.$^2$.

Example 1

A mixture, consisting of 9.4 gm. of tetrahydrofurfuryl methacrylate (stabilized with 0.006% of hydroquinone), 0.5 gm. of a commercial 70% cumene hydroperoxide solution and 0.1 gm. of triethylamine, was prepared.

(a) Sheets of galvanized iron were coated with this mixture. The sheets had previously been sprayed with a 5% solution of 2,4-toluylene diisocyanate in ethylene trichloride and then air-dried for 20 minutes (giving an application of 3 g./m.$^2$). For the process of bonding under exclusion of oxygen, one drop of the mixture was applied onto the point to be bonded, and the sheets were held together under a pressure of about 0.05 kg./cm.$^2$. After holding the plates for 30 minutes at room temperature, a shear strength of the adhesive bond of 120 kg./cm.$^2$ was recorded.

By way of comparison, galvanized iron sheets not treated with a polyisocyanate showed, after an identical period of time, no sign of adhesion when utilizing the same adhesive mixture.

(b) With the same adhesive mixture, in identical manner, sheets of electrically-oxidized aluminum, pre-treated with a 5% solution of 2,4-toluylene diisocyanate, were bonded together as above. After 5 minutes a shear strength of the adhesive bond of 40 kg./cm.$^2$ was obtained.

On untreated sheets of the same material used for the purpose of comparison, the adhesive exhibited no bonding capacity even after 2 hours of pressing together.

Example 2

In the adhesive mixture prepared according to Example 1, tetrahydrofurfuryl methacrylate was substituted by triethyleneglycol dimethacrylate.

(a) Galvanized iron sheets were dipped into 5% solution of 2,4-toluylene diisocyanate in methylene chloride and air-dried (the application amounting to 4 g./m.$^2$). The plates were bonded together with the mixture indicated above, and held at room temperature under exclusion of oxygen for 30 minutes. A shear strength of the adhesive bond of 40 kg./cm.$^2$ was ascertained. Untreated sheets having a similar adhesive mixture applied could be separated after the same period of time without offering any resistance.

(b) Sheets of electrically-oxidized aluminum, pretreated in the same manner with the toluylene diisocyanate solution were bonded together with the same mixture. The shear strength, after 5 minutes at room temperature under exclusion of oxygen, was 35 kg./cm.$^2$. Untreated sheets having the adhesive mixture applied thereto could be separated after 2 hours of contact without difficulty.

Example 3

Roughened iron sheets, dipped into a 5% solution of 2,4-toluylene diisocyanate in ethylene trichloride (giving an application of 5 g./m.$^2$), were cooled, subsequent to the evaporation of the solvent, to about 5° C. One drop of an adhesive mixture, consisting of 9.4 gm. of triethyleneglycol dimethylacrylate, 0.5 gm. of 70% cumene hydroperoxide and 0.1 gm. of triethylamine, was applied onto one of the surfaces to be bonded. The parts were joined together under exclusion of oxygen, and the temperature of the test sample was maintained at about 5° C. After 10 minutes, a shear strength of 55 kg./cm.$^2$ was noted. The comparison test at the same temperature with the same iron sheets, but not pretreated, showed that the sheets could be separated without resistance after 1½ hours of joinder.

Example 4

Roughened iron plates were dipped into a 5% solution of phenyl isocyanate in trichloride ethylene. After evaporation of the solvent (¼ hour), the application amounted to 4 g./m.$^2$. The sheets were coated with the adhesive mixture described in Example 1 and held for 30 minutes under exclusion of oxygen at room temperature. After this time the shear strength of the adhesive bond amounted to 65 kg./cm.$^2$.

Example 5

9.1 gm. of tetrahydrofurfuryl methacrylate (stabilized with 0.006% of hydroquinone), 0.7 gm. of a 50% solution of 2,2'-bis-(t.-butyl-peroxy)-butane in dimethyl phthalate and 0.2 gm. of a 10% solution of triethylamine in dimethyl phthalate were admixed. One drop of this mixture was sufficient to bond two roughened iron plates sprayed with a 5% solution of 2,4-toluylene diisocyanate (coating=4 g./m.²) within the space of 1 hour. After holding the plates at room temperature, a shear strength of the adhesive bond of 100 kg./cm.² was obtained. A comparison test with roughened iron sheets, not pretreated, did not yield any adhesion even after 3 hours.

Example 6

8.1 gm. of 2-hydroxyethyl methacrylate (stabilized with 0.006% of hydroquinone) were admixed with 1 gm. of polymethyl methacrylate (molecular weight about 100,000), 0.7 gm. of a commercial 70% solution of cumene hydroperoxide and 0.2 gm. of triethylamine. Two sheets of electrically oxidized aluminum were coated with this mixture and held together. No bonding was obtained between the untreated sheets even after 2 hours.

Next, the same aluminum sheets were first dipped into commercial toluylene diisocyanate and any excess was wiped off. The coating amounted to about 10 g./m.². Thereafter they were bonded with the same adhesive mixture.

After 5 minutes of holding under exclusion of oxygen at room temperature, the adhesive bond exhibited a shear strength of 50 kg./cm.².

Example 7

An adhesive mixture consisting of 9.4 gm. of methacrylic acid ester of tetrahydrofurfuryl alcohol (stabilized with 0.006% of hydroquinone), 0.5 gm. of a commercial 70% solution of cumene hydroperoxide and 0.1 gm. of 1,4-diazabicyclo-(2,2,2)-octane, was prepared.

Glass slides, 2 cm. wide, were dipped into a 5% solution of the addition product of 3 mols of toluylene diisocyanate to 1 mol of trimethylolpropane (coating=4 g./m.²). After the solvent had evaporated, one drop of the above described mixture was applied onto the pretreated glass slides. which were then joined together with a 2 cm.² overlap under a pressure of 0.05 kg./cm.². Already after 10 minutes at room temperature, firm adhesion was observed between the glass surfaces.

Example 8

Plates of polymethylmethacrylate (2 cm. wide) were sprayed with a 5% solution of 2,4-toluylene diisocyanate in ethylene trichloride and after drying the plates for 20 minutes, they were cooled to a temperature of about 5° C. (coating=4 g./m.²). At this temperature they were coated with the adhesive mixture, described in Example 1, and jointed together, overlapping by 1 cm. After only 10 minutes at a temperature of about 5° C., the plates were securely bonded (shear strength=20 kg./cm.²).

Example 9

Glass plates 2 cm. wide, were bonded together with the adhesive mixture of Example 2, at a temperature of about 5° C., after having been pre-treated with a 5% solution of toluylene diisocyanate in ethylene trichloride (coating =4 g./m.²). After 5 minutes a firm adhesion was already obtained.

COMPARISON TEST

Plates of polymethylmethacrylate 2 cm. wide were sprayed with a 5% solution of triethylenetetramine in ethylene trichloride (coating=about 5 g./m.²). After the plates were dried for 20 minutes, and then cooled to about 5° C., they were moistened with one drop of the adhesive mixture prepared according to Example 1. Two plates were joined together, overlapping by 1 cm., under a pressure of 0.05 kg./cm.². After a 3-hour storage at a temperature of 5° C., no adhesion had formed between the plates.

Thereafter, two glass plates, 2 cm. wide, were sprayed with 2.5% solution of triethylene tetramine and ethylhexanoic acid in ethylene trichloride (coating=about 5 g./m.²). After having been dried for 20 minutes, the plates were cooled to about 5° C., and one drop of the adhesive mixture, prepared according to Example 2 was applied thereon. The plates, overlapping by 1 cm., were joined together under a pressure o 0.05 kg./cm.². After being kept for 3 hours at a temperature of 5° C., no sign of adhesion was apparent.

The preceding specific embodiments are illustrative of the invention. It is to be understood however that other expedients, known to those skilled in the art, may be employed without departing from the spirit of the invention.

We claim:

1. A process for the acceleration of the hardening of adhesive compositions which harden under the exclusion of oxygen which comprises the steps of pretreating at least one of the surfaces of solid materials to be adhered with an accelerating amount of an organic isocyanate, interposing a layer of a liquid composition containing (1) at least 20% of esters of acrylic acid and methacrylic acid of the formula $$CH_2=CR-\underset{O}{\overset{\|}{C}}-O-A-(OH)_m$$

$$CH_2=CR-\underset{O}{\overset{\|}{C}}-O-A-(O-\underset{O}{\overset{\|}{C}}-CR=CH_2)_m$$

and $$CH_2=CR-\underset{O}{\overset{\|}{C}}-O-(CH_2)_n-R_1$$

wherein R is a member selected from the group consisting of hydrogen and methyl, $m$ is an integer of 1, 2 or 3, $n$ is an integer of 0 or 1, A is a member selected from the group consisting of $$-CH_2-CH_2-(O-CH_2-CH_2)_p-$$
$$-CHR-(CR_2)_z-CHR-$$

and $$-CH_2-CH_2-\underset{\underset{CH_2}{|}}{CH}-CH_2-CH_2$$

wherein R has the above-assigned values, $p$ is an integer of 1, 2, 3, 4 or 5, $z$ is an integer of 0, 1, 2, 3, or 4, and $R_1$ is a member selected from the group consisting of cyclopentanyl, cyclopentadienyl, cyclohexanyl, endomethylene cyclohexanyl, and their methyl substituted derivatives and their mono and dioxa derivatives, (2) from about 0.1% to about 20% of organic percompounds selected from the group consisting of organic hydroperoxides derived from hydrocarbons having from 3 to 18 carbon atoms, tert.-butyl perbenzoate and 2,2-bis-(tert.-butylperoxy)-butane, and (3) from about 0.1% ot 5% of tertiary amine, between said solid materials, and excluding oxygen from said layer for a time sufficient to harden said composition.

2. The process of claim 1 wherein said organic isocyanate is an aromatic polyisocyanate.

3. The process of claim 1 wherein the surfaces of said solid materials have a deposit of organic isocyanate of between 0.1 gm. per square meter to 10 gm. per square meter.

References Cited

UNITED STATES PATENTS

| | | |
|---|---|---|
| 2,682,530 | 6/1954 | St. John. |
| 3,028,269 | 4/1962 | Butler et al. _____ 260—78 |
| 3,041,203 | 6/1962 | Sites et al. _____ 204—159.22 |
| 3,180,777 | 4/1965 | Kard _____ 260—89.5 |

HARRY WONG, JR., Primary Examiner

U.S. Cl. X.R.

260—86.1, 88.3, 885; 117—132, 124, 138.8

PO-1050
(5/69)

A-3217 NLJr:la

UNITED STATES PATENT OFFICE
CERTIFICATE OF CORRECTION

Patent No. 3,525,726      Dated August 25, 1970

Inventor(s) Joachim Galinke et al

It is certified that error appears in the above-identified patent and that said Letters Patent are hereby corrected as shown below:

| Patent | | Appln. | | |
|---|---|---|---|---|
| Col. | Line | Pg. | Line | |
| 2 | 53 | 4 | 18 | The following words have been left out -- such as cumene hydroperoxide, tertiary butyl hydro- -- |
| 6 | 52 | Amend.C 3 | 2 | The word "ot" should be -- to -- |

REMARKS

This is to correct the omission of one line in the specification.

SIGNED AND
SEALED
JAN 5 1971

JAN. 15, 1971

(SEAL)
Attest:

Edward M. Fletcher, Jr.
Attesting Officer

WILLIAM E. SCHUYLER, JR.
Commissioner of Patents